United States Patent
Armstrong et al.

(10) Patent No.: US 10,340,960 B2
(45) Date of Patent: Jul. 2, 2019

(54) INDIVIDUAL BROADBAND COMMUNICATIONS HUB FOR OPERATIONAL AND TRAINING ENVIRONMENTS

(71) Applicant: Cubic Corporation, San Diego, CA (US)

(72) Inventors: Martyn Armstrong, Salisbury (GB); Neale Smiles, Salisbury (GB); Steven Taylor, Chilmark (GB); Rod Tuckwell, Salisbury (GB); Andrew Fox, Chippenham (GB)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 16/018,781

(22) Filed: Jun. 26, 2018

(65) Prior Publication Data

US 2018/0375535 A1 Dec. 27, 2018

Related U.S. Application Data

(63) Continuation of application No. 15/830,430, filed on Dec. 4, 2017, now Pat. No. 10,009,046.

(Continued)

(51) Int. Cl.
*H04M 1/00* (2006.01)
*H04B 1/00* (2006.01)
(Continued)

(52) U.S. Cl.
CPC ............ *H04B 1/0064* (2013.01); *F41G 3/26* (2013.01); *G09B 9/003* (2013.01); *G09B 9/006* (2013.01);
(Continued)

(58) Field of Classification Search
None
See application file for complete search history.

(56) References Cited

U.S. PATENT DOCUMENTS 5,623,642 A * 4/1997 Katz ................... G06F 17/5009
273/442
7,564,455 B2 * 7/2009 Gatewood, Jr. ......... G06T 19/00
345/419

(Continued)

FOREIGN PATENT DOCUMENTS

EP 0846440 A2 6/1998

OTHER PUBLICATIONS

Dahmann et al., "The Department of Defense High Level Architecture", Proceedings of the Winter simulation Atlanta, Georgia, USA—Dec. 7-10, 1997, New York, IEEE. US, Dec. 1, 1997, pp. 142-149.

(Continued)

*Primary Examiner* — Tuan A Tran
(74) *Attorney, Agent, or Firm* — Kilpatrick Townsend & Stockton, LLP

(57) ABSTRACT

A military communications unit that utilizes a relatively high-bandwidth digital communication networks (e.g., cellular networks) is capable of acting as a wireless communications hub for a soldier, vehicle, weapon, or other entity. The military communications unit can obtain data from multiple devices via close-range wireless technologies and communicate with training or operational networks. The military communications unit can be flexible in its capacity to relay data by formatting data in accordance with Distributed Interactive Simulation (DIS), High-Level Architecture (HLA), and/or another distributed computer simulation standard. Moreover, the military communications unit may be further capable of "re-banding," enabling communications (Continued)

using cellular protocols and/or standards in non-cellular frequency bands.

20 Claims, 7 Drawing Sheets

Related U.S. Application Data

(60) Provisional application No. 62/429,628, filed on Dec. 2, 2016.

(51) Int. Cl.
*H04B 1/38* (2015.01)
*F41G 3/26* (2006.01)
*H04L 29/08* (2006.01)
*G09B 9/00* (2006.01)
*F41J 5/14* (2006.01)
*H04W 88/06* (2009.01)
*H04W 84/18* (2009.01)
*H04W 88/04* (2009.01)

(52) U.S. Cl.
CPC .............. *H04B 1/38* (2013.01); *H04L 67/12* (2013.01); *F41J 5/14* (2013.01); *G09B 9/00* (2013.01); *H04W 84/18* (2013.01); *H04W 88/04* (2013.01); *H04W 88/06* (2013.01)

(56) References Cited

U.S. PATENT DOCUMENTS

| | | | | |
|---|---|---|---|---|
| 8,024,481 B2* | 9/2011 | Thornton | ............ | H04L 67/1008 709/202 |
| 8,069,605 B2* | 12/2011 | Fressola | ................... | H05C 1/06 33/266 |
| 8,122,459 B2* | 2/2012 | Herring | ................... | A63F 13/10 273/317 |
| 8,339,257 B2* | 12/2012 | Cazanas | ................. | F41A 19/01 340/539.1 |
| 8,345,097 B2* | 1/2013 | Zampieron | ...... | G08B 13/19669 348/143 |
| 8,475,282 B1* | 7/2013 | Herring | ................. | A63F 13/352 463/1 |
| 8,645,112 B2* | 2/2014 | Falash | ..................... | H04L 67/38 703/6 |
| 8,751,203 B2* | 6/2014 | Falash | ..................... | H04L 67/38 703/6 |
| 8,751,204 B2* | 6/2014 | Falash | ..................... | H04L 67/38 703/6 |
| 8,783,575 B2* | 7/2014 | Finlayson | ............. | F41G 3/2655 235/435 |
| 8,823,701 B2* | 9/2014 | Aldridge | ............... | A63F 13/358 345/419 |
| 9,457,229 B2* | 10/2016 | Liang | ...................... | G01P 15/18 |
| 9,638,537 B2* | 5/2017 | Abramson | ......... | G01C 21/3626 |
| 9,752,840 B1* | 9/2017 | Betro | .................... | H04W 4/028 |
| 9,803,942 B2* | 10/2017 | Milde, Jr. | ............. | F41A 17/066 |
| 9,897,407 B2* | 2/2018 | Kramer | ................. | F41A 17/063 |
| 2003/0187933 A1 | 10/2003 | Beavin | | |
| 2004/0121292 A1 | 6/2004 | Chung et al. | | |
| 2006/0125630 A1 | 6/2006 | Parkulo | | |
| 2006/0252999 A1 | 11/2006 | DeVaul et al. | | |
| 2007/0087798 A1* | 4/2007 | McGucken | ............. | A63F 13/10 463/1 |
| 2007/0115955 A1* | 5/2007 | Byer | ....................... | F41C 23/22 370/360 |
| 2008/0111680 A1* | 5/2008 | Presicci | .................. | F41H 11/00 340/539.22 |
| 2010/0221685 A1 | 9/2010 | Carter | | |
| 2012/0183928 A1* | 7/2012 | Finlayson | ............. | F41G 3/2655 434/16 |
| 2014/0023995 A1 | 1/2014 | Jones et al. | | |
| 2014/0292537 A1 | 10/2014 | Huang et al. | | |
| 2016/0252326 A1 | 9/2016 | Jones et al. | | |
| 2016/0324472 A1 | 11/2016 | Kaskoun et al. | | |
| 2017/0026988 A1* | 1/2017 | Guo | .................. | H04W 72/1242 |

OTHER PUBLICATIONS

International Search Report dated Jan. 26, 2018 in related PCT/US2017/064440, all pages.
Written Opinion in European application No. PCT/US2017/064440, all pages.
Search Report dated May 29, 2018 in related United Kingdom application No. 1720144.3, all pages.

* cited by examiner

INDIVIDUAL BROADBAND COMMUNICATIONS HUB FOR OPERATIONAL AND TRAINING ENVIRONMENTS

CROSS-REFERENCES TO RELATED APPLICATIONS

The present application is a continuation of U.S. Nonprovisional application Ser. No. 15/830,430, filed Dec. 4, 2017, which claims the benefit under 35 USC § 119(e) of U.S. Provisional Application No. 62/429,628, filed on Dec. 2, 2016, entitled "Individual LTE Communications Interface." Both of these applications are hereby incorporated by reference for all purposes.

BACKGROUND

Traditional simulated training environments for military applications, such as multiple integrated laser engagement system (MILES), typically used analog radios communicating in Very High Frequency (VHF) and/or Ultra High Frequency (UHF) frequency bands for voice and data communication. Operational communication networks traditionally used similar technology. These traditional technologies were very bandwidth limited, on the order of tens of kbps, thereby heavily restricting what type of data was communicated in operational and training environments.

For example, in a MILES training environment with 1000 soldiers, the communication network used by the training environment may have been only able to handle providing location updates for each soldier every 20 seconds or so. This scarceness of information can be detrimental to modern-day training environments—and certainly modern-day operational applications—in which there may be a large number of entities interacting or communicating.

BRIEF SUMMARY

A military communications unit is provided that addresses these and other issues by exploiting Long-Term Evolution (LTE) or other relatively high-bandwidth digital communication networks (e.g., cellular networks), which (presently) can deliver tens or even hundreds of Mbps of throughput. The military communications unit is capable of acting as a local wireless hub for a soldier, vehicle, weapon, or other entity by obtaining data from multiple devices via close-range wireless technologies (e.g., Bluetooth®, Wi-Fi®, Zigbee®, etc.) and communicating the data to a training environment or operational network (and similarly relaying information back from the training environment or operational network to the devices). The military communications unit can be flexible in its capacity to relay data by formatting data in accordance with Distributed Interactive Simulation (DIS), High-Level Architecture (HLA), and/or another distributed computer simulation standard. Moreover, the military communications unit may be further capable of "rebanding," in which they can communicate via VHF, UHF, or other non-cellular frequency bands using cellular (LTE or similar) technology and protocols.

An example military communications unit, according to the description, comprises a wireless communication interface having a communication network transceiver configured to communicate with a wireless communication network and a plurality of additional transceivers, where each additional transceiver is configured to wirelessly communicate with one or more devices separate from the military communications unit. The military communications unit further comprises a memory, a power supply, and a processing unit powered by the power supply and communicatively coupled with the wireless communication interface and the memory. Processing unit is configured to cause the military communications unit to obtain, via a first transceiver of the plurality of additional transceivers, a first set of data from a first device of the one or more devices separate from the military communications unit, create a first message, indicative of the first set of data obtained from the first device, in accordance with a protocol of a distributed computer simulation standard, and send the first message via the communication network transceiver.

Embodiments of the military communications unit can include one or more of the following features. The distributed computer simulation standard may comprise Distributed Interactive Simulation (DIS) or High-Level Architecture (HLA). One or more transceivers of the plurality of additional transceivers may be configured to communicate using Bluetooth, Wi-Fi, Zigbee, or Near-Field Communication (NFC), or any combination thereof. The communication network transceiver may be configured to communicate with the wireless communication network using a plurality of radio frequency (RF) bands. The data from the first device may comprise biometric, video, orientation, audio, atmospheric, or activity data, or any combination thereof. The processing unit may be further configured to obtain, from a second military communications unit via the first transceiver of the plurality of additional transceivers or a second transceiver of the plurality of additional transceivers, a second message, and send the second message via the first transceiver of the plurality of additional transceivers. The first set of data may include an orientation of a weapon and an indication that the weapon was fired, the processing unit may be further configured to calculate a trajectory of ammunition fired by the weapon, based on the first set of data, and the first message may comprise an indication of the calculated trajectory. The memory may be configured to store one or more software applications, and the processing unit may be configured to calculate the trajectory of the ammunition fired by the weapon by executing one of the one or more software applications stored by the memory. The processing unit may be configured to cause the military communications unit send the first message to at least one server executing a synthetic training environment. The military communications unit may comprise a Global Navigation Satellite System (GNSS) receiver module, and an Inertial Measurement Unit (IMU).

An example method of operating a military communications unit, according to the description, comprises obtaining, with a military communications unit having a communication network transceiver and a plurality of additional transceivers, a first set of data from a first device of one or more devices separate from the military communications unit, wherein the first set of data is obtained using a first transceiver of the plurality of additional transceivers. The method further comprises creating, with the military communications unit, a first message, wherein the first message is indicative of the first set of data obtained from the first device, and formatted in accordance with a protocol of a distributed computer simulation standard. The method also comprises sending the first message via the communication network transceiver of the military communications unit.

Embodiments of the method can further include one or more of the following functions. The distributed computer simulation standard may comprise Distributed Interactive Simulation (DIS) or High-Level Architecture (HLA). The first transceiver of the plurality of additional transceivers may obtain the first set of data using Bluetooth, Wi-Fi, Zigbee, or Near-Field Communication (NFC), or any combination thereof. The method may further comprise using the communication network transceiver to communicate with a wireless communication network with a plurality of radio frequency (RF) bands. The data from the first device may comprise biometric, video, orientation, audio, atmospheric, or activity data, or any combination thereof. The method may further comprise obtaining, from a second military communications unit via the first transceiver of the plurality of additional transceivers or a second transceiver of the plurality of additional transceivers, a second message, and sending the second message via the first transceiver of the plurality of additional transceivers. The method may further comprise comprising causing the military communications unit to determine, from the first set of data, an orientation of a weapon and an indication that the weapon was fired, calculate a trajectory of ammunition fired by the weapon, based on the first set of data, and include, in the first message, an indication of the calculated trajectory. The method may further comprise executing a software application stored in a memory of the military communications unit to calculate the trajectory of the ammunition fired by the weapon. Sending the first message may comprise sending the first message to at least one server executing a synthetic training environment. The method may further comprise including, in the first message, information obtained from a Global Navigation Satellite System (GNSS) receiver module of the military communication unit, or an Inertial Measurement Unit (IMU) of the military communications unit, or any combination thereof.

BRIEF DESCRIPTION OF THE DRAWINGS

For a more complete understanding of this invention, reference is now made to the following detailed description of the embodiments as illustrated in the accompanying drawings, in which like reference designations represent like features throughout the several views and wherein.

In the appended figures, similar components and/or features may have the same reference label. Further, various components of the same type may be distinguished by following the reference label by a dash and a second label that distinguishes among the similar components. If only the first reference label is used in the specification, the description is applicable to any or all of the similar components having the same first reference label irrespective of the second reference label.

DETAILED DESCRIPTION OF THE INVENTION

The ensuing description provides embodiments only, and is not intended to limit the scope, applicability or configuration of the disclosure. Rather, the ensuing description of the embodiments will provide those skilled in the art with an enabling description for implementing an embodiment. It is understood that various changes may be made in the function and arrangement of elements without departing from the scope.

It can be noted that, although embodiments provided herein describe a communications interface or unit using LTE or other cellular technology, other wireless technologies can be used in addition or as an alternative to LTE to communicate with a wide area network (WAN) or other digital communication network. These technologies can include, for example, fifth-generation (5G) New Radio (NR) or Nth generation (NG) wireless standards and protocols. A person of ordinary skill in the art will appreciate that such standards evolve, and that new equivalent standards may take their place.

Additionally, as used herein, the terms "training," "simulation," "simulated training environment" and similar terms may be used interchangeably and refer to a controlled training environment in which weapons are typically used with blank or simulated ammunition. The terms "operational," "tactical operations," and similar terms may be used interchangeably and refer to operations or environments that are considered "live," which typically use live ammunition.

Figure 1:
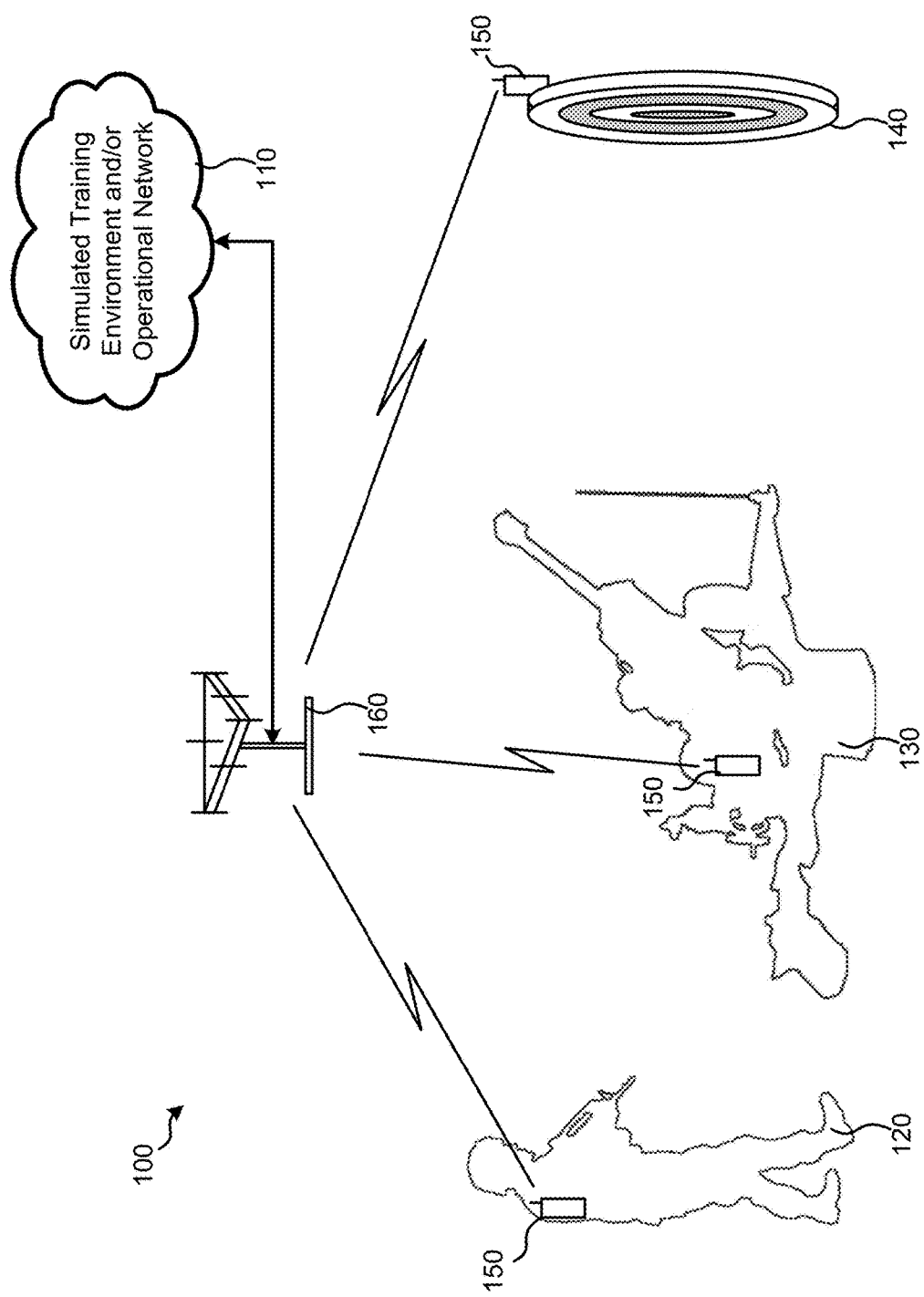
FIG. 1 is a simplified illustration of a military communication system, according to an embodiment.

FIG. 1 is a simplified illustration of a military communication system 100, according to an embodiment. As discussed herein below, the military communication system 100 may be capable of providing communication between a communications network 110 and devices associated with various military entities, such as soldiers 120, artillery 130 (and/or other weapons), and targets 140, as well as other entities that are not illustrated, such as vehicles, buildings, etc.

It can be noted that, to avoid clutter, FIG. 1 illustrates only one soldier 120, artillery 130, and target 140 is illustrated, a military communication system. However, a person of ordinary skill in the art will appreciate that some embodiments may have any number of each entity type (including no entities of a certain type). For example, in a given training, or operational environment, the military communication system 100 may comprise dozens, hundreds, or even thousands (or more) of soldiers 120, artillery 130, and/or targets 140. Moreover, embodiments additionally or alternatively may include any number of base stations 160.

In brief, each military entity 120, 130, 140 is provided with a military communications unit 150 that is capable of communicating with the simulated training environment and/or operational network 110 via a base station 160. As previously noted, the military communications units 150 can communicate using high-bandwidth digital communication standards, such as LTE or other cellular technologies, thereby giving the military communication system a very high throughput capacity, relative to traditional techniques. (In the case of LTE, the base station 160 would comprise a gNodeB (gNB).)

With this new, high-throughput capacity, the military communication system 100 can collect and communicate a high volume of data, improving the accuracy and effectiveness of simulated training environments and/or tactical operations. For instance, rather than a MILES training environment that is limited to providing a location of a soldier 120 every 20 seconds, the military communication system 100 can provide training environment that collects detailed data for each soldier 120 several times per second. This data can include not only the soldier's location, but also information about the soldier's orientation, the orientation of the soldier's weapon, biometric information, video information, and more. Moreover, the military communication system 100 can communicate similar information regarding artillery 130, targets 140, and/or other entities. The military communications units 150 can further provide communication from the simulated training environment or operational network 110 back to the soldiers 120, artillery 130, targets 140, and/or other entities to provide instructions, configure devices, and more.

Figure 2:
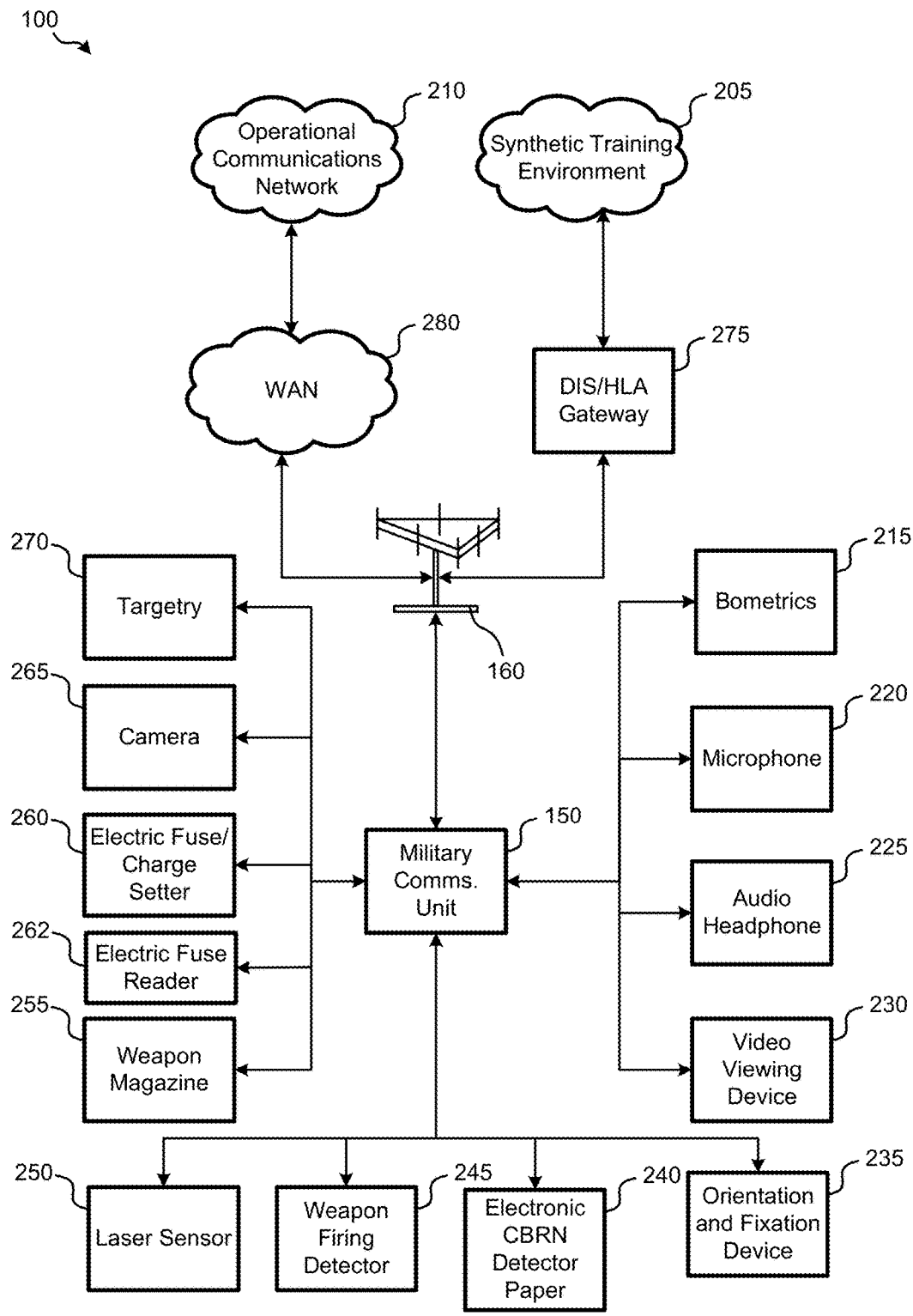
FIG. 2 is a block diagram of the military communication system, according to an embodiment.

FIG. 2 is a block diagram of the military communication system 100, according to an embodiment. This figure helps illustrate the various types of devices that may be communicatively coupled with the military communications unit 150, as well as the distinctions between the synthetic training environment 205 and operational communications network 210. It can be noted that show the devices illustrated in FIG. 2 are provided as illustrative examples only. Embodiments may have additional or alternative devices, and may utilize any or all of the illustrated devices, or other types of devices, as needed during operational and/or training environments.

Arrows illustrated in FIG. 2 represent communication links between the various components. These communication links may use wireless and/or wired technologies. That said, embodiments may ensure that most or all of the illustrated communications links to/from the military communications unit 150 are wireless, for the sake of convenience. These wireless connections can include technologies such as Bluetooth®, Bluetooth Low Energy (BLE), Zigbee®, Wi-Fi®, near field communications (NFC), and/or other wireless technologies. To help ensure security communications, these wireless and/or wired communication links may use one or more types of encryption, which can be made to meet military-grade standards, if required.

It can be further noted that the types of devices connected to the military communications unit 150 can vary, depending on the type of entity to which the military communications unit is associated. For example, the soldier 120 of FIG. 1 may wear biometric unit 215, a microphone, 220, and audio headphone 225, etc. On the other hand, artillery 130 or target 140 may not use any of these devices, but instead utilizing a different configuration of devices entirely. Moreover, different configurations of devices may be used in the synthetic training environments than in operational environments. And although only one device of each device type, as illustrated in FIG. 2, it will be understood that alternative embodiments may utilize multiple devices of the same type, as desired.

A biometric unit 215 may comprise one or more biometric sensors, which may be worn in various locations by a user. These biometric sensors can read various data that can provide information regarding the health and well-being of the user, which can be vital during simulated and operational activity. Such sensors can include one or more of the phenomena, heart rate meter, body temperature thermometer, and/or other sensors that can read biometric information, such as steps taken, heart rate, temperature, blood pressure, rate of breathing, and/or other biometric functions. The biometric unit 215 may comprise a central processor that gathers information from the various biometric sensors, and provides it to the military communications unit 150.

Alternatively, embodiments may enable the military communications unit 152 communicate separately with each biometric sensor.

It can be noted that embodiments may employ additional or alternative sensors, which may be utilized for situational awareness and other information. For example, sensors may detect movement of a military entity (e.g. soldier, weapon, vehicle, etc.) to inform a determination of an activity in which the military entity is engaged (e.g., for soldier, this could comprise prone, kneeling, climbing, jumping, standing, etc.). In some embodiments, the military communications unit 150 can gather sensor information and make this determination. Other sensor information, such as atmospheric conditions, may also be gathered. Information gathered from sensors and other components communicatively coupled with the military communications unit 150 can be combined with corresponding data from other military communications units, using "crowdsourcing" to track larger trends/patterns among the various military entities in a training or operational environment.

A microphone 220 can be worn by a user (e.g., soldier) near the user's mouth to provide a variety of functions. For example, the microphone may be coupled to an/or enabled by a button or other user input, to enable push-to-talk radio functionality. This radio functionality may enable any two users communicatively connected with the operational communications network 210 (e.g., via a military communications unit 150 or other communications unit coupled with the operational communications network 210) to communicate with each other via one-way or two-way audio communications. Additionally or alternatively, one or more microphones, 220 may be utilized to enable situational awareness of the military communications unit 150 and the entity (soldier, vehicle, weapon, etc.) associated therewith. In such cases, the military communications unit 150 may gather audio from the one or more microphones 220, and make a determination based on the audio (and/or data gathered from other sources, such as a camera 265, biometric unit 215, etc.) of an activity in which one or more entities near the microphone(s) 220 are engaged.

The microphone 220 may also enable a user to provide audio commands to control one or more of the components in the military communications system 100, if desired. In some embodiments, audio received from the microphone 220 by the military communications unit 150 can be processed by the military communications unit 150 to decipher various audio commands. The military communications unit 150 can then provide information indicative of these commands to the one or more components in the military communication system 100, to which these commands pertain.

An audio headphone 225 can also be used for a variety of purposes. For example, the audio headphone 225 can be used by a user, along with a microphone 220, to enable audio communications in the manner described above. The audio headphone 225 can also provide audio feedback from one or more of the components in the military communication system 100. For instance, if, in a simulated training environment, one or more laser sensors 250 detects that the user has been "shot," that information can be relayed via the military communications unit 150 to audio headphone 225, giving the user a corresponding audio indication.

A video viewing device 230 can be used, if desired, to provide images to user. The video viewing device 230 may comprise a simple display in some embodiments. In other embodiments, the video viewing device may comprise a tablet, smart phone, or other electronic device with the display. The type of wireless technology used to communicatively connect the video viewing device 232 the military communications unit 150 may depend on how video is streamed to the video viewing device 230 (e.g., level of compression, bit rate, etc.) and the corresponding bandwidth requirements. The video viewing device 230 can provide streaming video from a camera local to the military communications unit 150 (e.g., camera 265) or a remote video source communicatively coupled with the military communications unit 150. Additionally or alternatively, the video viewing device 230 can provide other information (via images and/or text), such as situational awareness information.

One or more orientation and fixation devices 235 may also be communicatively connected with the military communications unit 150. An orientation and fixation device 235 may help determine orientation of the user and/or object associated with the military communications unit 150. The orientation and fixation device 235 may comprise, for example, an inertial measurement unit (IMU) with one or more accelerometers, gyroscopes, altimeters, magnetometers, etc. to provide data regarding the orientation of an object on which the orientation and fixation device 235 is/are attached. In some embodiments, for example, the orientation and fixation device 235 may be disposed on a weapon to determine an orientation of the weapon. When a weapon is fired, orientation information from the orientation and fixation device 235 to determine the trajectory of the weapon's ammunition in an operational environment or the weapon's "virtual" ammunition in a training environment. In some embodiments, the orientation and fixation device 235 may be disposed on the helmet and/or chest of a soldier to determine which direction the soldier is looking and/or facing.

An electric Chemical, Biological, Radiological, and Nuclear (CBRN) detector paper unit 240 can also be communicatively connected with the military communications unit 150. CBRN detector paper is something that is utilized in military applications, often worn by soldiers, to detect CBRN-based threats. In training environments the electric CBRN detector paper unit 240 may comprise an electronic screen (light-emitting diode (LED), e-paper, etc.) capable of simulating CBRN detector paper by changing colors when a threat is simulated. Thus, the synthetic training environment 205 can simulate a CBRN threat by transmitting information to the electric CBRN detector paper unit 240 via the military communications unit 150, causing the electric CBRN detector paper unit 240 to simulate a detected threat. A similar device may be utilized in operational scenarios, where CBRN detectors local to a remote from the military communications unit 150 detect a CBRN threat and communicate information indicative of the detection to the electric CBRN detector paper unit 240, thereby alerting the user. Additionally or alternatively, one or more CBRN detectors may be worn by a user and/or disposed on an object, and communicatively coupled with the military communications unit 150, to enable detection of CBRN threats local to the military communications unit 150 and communication of corresponding detection information.

A weapon firing detector 245 can communicate information indicative of the firing of a weapon. In other words, when a weapon (either directly associated with the military communications unit 150, or carried by a soldier associated with the military communications unit 150) is fired, the weapon firing detector 245 can detect the firing and communicate this information via the military communications unit 150 back to the synthetic training environment 205 and/or operational communications network 210, depending on desired functionality. As previously mentioned, the weapon firing detector 245 can be used in conjunction with the orientation and fixation device 235 in a training environment to determine a trajectory of the ammunition fired by the weapon, enabling higher fidelity than traditional systems. In an operational environment, information from the weapon firing detector 245 may also be useful in some applications.

One or more laser sensors 250 may be utilized in some embodiments. Here, the laser sensor 250 may comprise a MILES laser detector, capable of receiving laser signals from simulated weapon firing during a training exercise. For example, the simulated enemy combatant may fire a weapon which, upon simulated firing, emits a laser beam that illuminates a laser sensor 250 worn by a soldier 120 associated with the military communications unit 150. The laser sensor 250 can communicate detection of the laser beam back to the synthetic training environment 205, which may determine that the soldier has been "virtually" shot. Various laser sensors 250 may be worn by a soldier 120 at various locations, to help determine where the soldier 120 was virtually shot, enabling for the determination of whether a soldier is "wounded" or "killed" for training purposes. In some embodiments, one or more laser sensors 250 may also be used in the training and/or operational environment for optical communications.

A weapon magazine unit 255 may comprise a sensor that report how many rounds are in a weapon magazine. During training, a weapon magazine may comprise blank or simulated ammunition, which may be tracked by the sensor, which can report the number of rounds in the weapon magazine from the weapon magazine unit 255 to the synthetic training environment 205 via the military communications unit 150. Information regarding a weapon's magazine can be utilized to determine logistical and other related information.

The electric fuse/charge setter unit 260 can be used in applications involving artillery training. A fuse setter for an artillery shell can be set to determine when the artillery shell goes off (e.g., above ground, after impact, etc.), a charge setter for an artillery shell can be set to determine how much charge is used for firing the shell. For training, artillery units (e.g., artillery 130 of FIG. 1) may be outfitted with simulated artillery shells that can use an electric fuse and simulated charge to enable soldiers to simulate setting the fuse and charge for the artillery shell during training. The electric fuse fuse/charge unit 260 can provide information to help determine whether the fuse and/or charge for a particular ammunition shell was/were properly set during training. Similarly, an electric fuse reader 262 can be used to ensure that the electric fuse was properly read (in training exercises where separate reading of the fuse is required). Information from the electric fuse/charge setter 260 and/or electric fuse reader 262 can be provided back to the synthetic training environment 205 via the military communications unit 150. In some embodiments, the electric fuse/charge setter 260 and/or electric fuse reader 262 may be used in live operations, in which case sensors could be used to determine whether the fuse for a live artillery shell was properly set, proper charge was included, and/or the fuse was properly read. In applications where information regarding fuse reading is not required, the electric fuse reader 262 may be omitted.

A camera 265 may be communicatively connected with the military communications unit 150 for any of a variety of reasons, depending on functionality. For example, the camera 265 may capture still images and/or video and send the images/video (via the military communications unit 150) to another device connected to the operational communications network 210 and/or synthetic training environment 205. Additionally or alternatively, images from the camera may be processed (either locally by the military communications unit 150 or by a remote device communicatively coupled with the operational communications network 210 or synthetic training environment 205) for object identification and/or other image features to help determine situational awareness data. In some embodiments, the camera 265 may stream video and/or capture images that may be displayed on the video viewing device 230.

A targetry unit 270 may be used in certain embodiments. If, for example, the entity to which the military communications unit 150 is associated comprises a target 140, than a targetry unit 270 may be utilized. Here, the targetry unit 270 may comprise any of a variety of sensors and/or devices utilized in a target 140, which may vary, depending on the target type. Sensors may include laser sensors (similar to laser sensor 250), for example, to determine whether the target was hit during MILES training. For live ammunition training, sensors may include any of a variety of optical, electric, and/or other sensors to detect motion, damage, and/or other indicators of the target 140 being hit. In some embodiments, the targetry unit 270 may be equipped with devices that "shoot back" during a training session by emitting a laser beam during MILES training, for example.

The military communications unit 150 can enable communication between these components 215-270 and the operational communications network 210 and/or synthetic training environment 205. If needed, the military communications unit 150 can provide local, processing and/or other functionality. In some embodiments, this functionality may be customized by executing different software applications by the military communications unit 150. For example, the military communications unit 150 may operate using the Android™ operating system, thereby being able to execute any of a variety of software programs (or "apps") executable for Android, which may include commercial and/or military applications. Some of these software programs may be customize for execution specifically by the military communications unit 150. Other embodiments may utilize other types of operating systems, as desired.

Communication between the operational communications network 210 and the military communications unit 150 may pass through a Wide Area Network (WAN) 280, such as a cellular network. The WAN 280 may comprise one or more private and/or public networks, military and/or commercial providers, and may utilize any of a variety of wireless and/or wired technologies. Additional information regarding possible WAN types is provided below.

The operational communications network 210 comprises a communications network that allows communications to and from a network of military communications units 150 during live operations. In some embodiments, the operational communications network 210 may comprise an LTE network. In other embodiments, the operational communications network 210 may operate on traditional VHF/UHF networks. Communications between the various devices communicatively coupled with the operational communications network 210 may comprise voice or data communications.

The synthetic training environment 205 comprises one or more simulation systems used in training simulations. The synthetic training environment 205 may comprise, for example, a network that can utilize military communications units 150 for training purposes in a training environment, providing data from the military communications units 150 to any of a variety of servers executing simulation systems (e.g., flight simulators, battlefield simulators, etc.). As discussed in further detail below, the military communications unit 150 can communicate with the synthetic training environment 205 using Distributed Interactive Simulation (DIS) and/or High-Level Architecture (HLA). Thus, embodiments may include a DIS and/or HLA Gateway 275, which can parse and federate data provided by the various military communications units 150, and provide it to simulation systems and/or other devices of the synthetic training environment 205.

The military communications unit 150 can be configured to communicate with both the operational communications network 210 and the synthetic training environment 205, and thus the military communications unit 150 can be used in both training and operational environments. This can save costs and reduce the amount of gear required for soldiers and/or other military entities when transitioning between operational and training environments.

Figure 3:
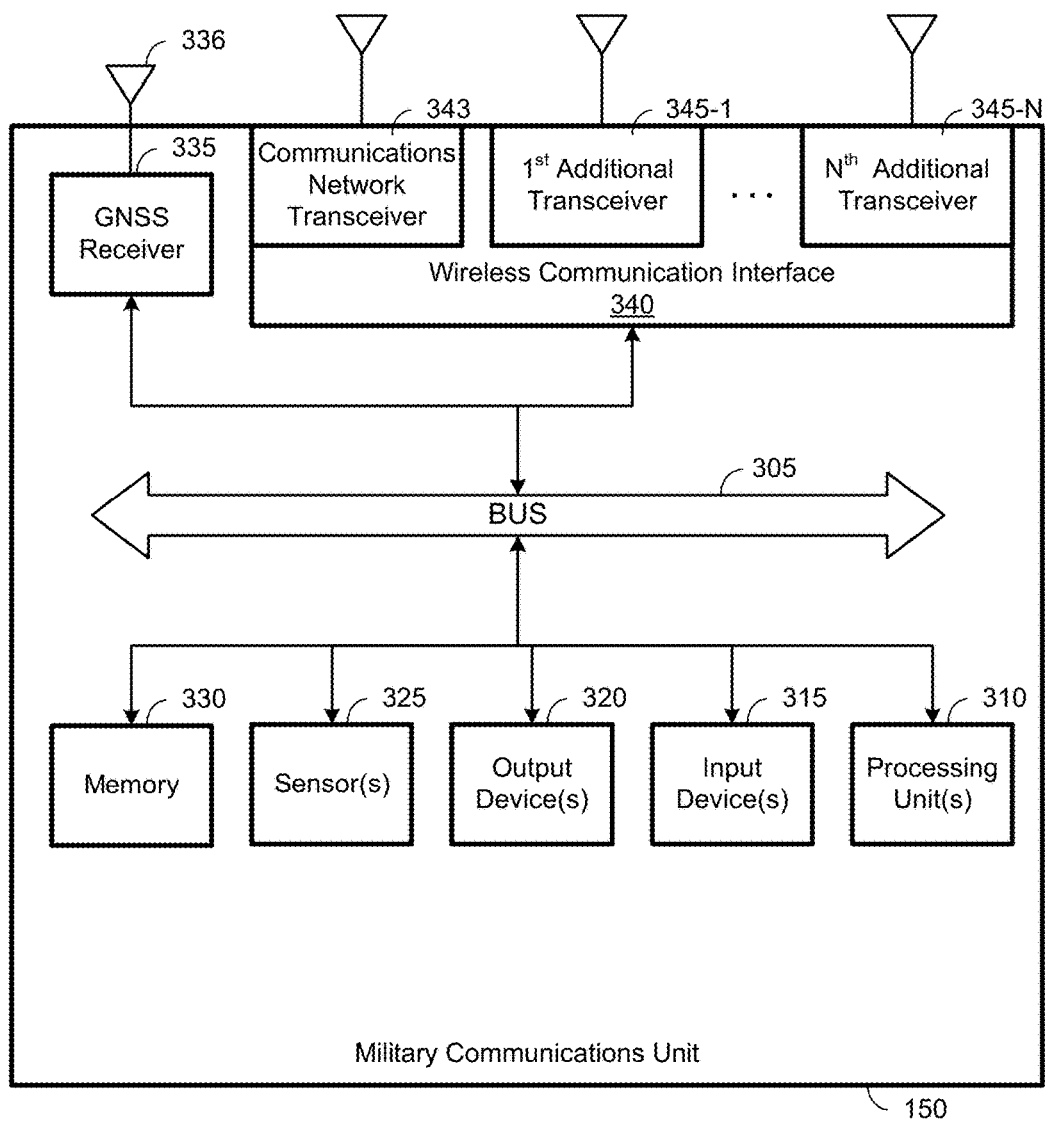
FIG. 3 is a simplified block diagram of the internal components of a military communications unit, according to an embodiment.

FIG. 3 is a simplified block diagram of the internal components of a military communications unit 150, according to an embodiment. As with other figures provided herein, it will be understood that alternative embodiments may comprise alternative configurations of the components, and may add, omit, combine, separate, and/or otherwise alter components, depending on desired functionality. The military communications unit 150 may comprise a military design meeting military-grade standards, thereby configured to withstand higher levels of physical impacts, temperature extremes, and/or other environmental hazards than a consumer device. Nonetheless, a consumer-grade design and/or design met to meet other standards may be used if so desired. It will be understood that the military communications unit 150 may comprise other electrical components (e.g., a battery or other power source) not illustrated in FIG. 3.

The various hardware components (components labeled 310-340) of the military communications unit 150 that can be electrically coupled via a bus. 305 (or may otherwise be in communication, as appropriate). The hardware elements may include a processing unit(s) 310 which may comprise without limitation one or more general-purpose processors, one or more special-purpose processors (e.g., application specific integrated circuits (ASICs), and/or the like), reprogrammable circuitry, and/or other processing structure or means, which can be configured to cause the military communications unit 150 to perform the functionality described herein. The military communications unit 150 also may comprise one or more input devices 315, which may comprise without limitation one or more touch screens, touch pads, buttons, dials, switches, and/or the like; and one or more output devices 320, which may comprise without limitation, one or more displays, light emitting diode (LED) s, speakers, and/or the like. In military applications, the input device(s) 315 and/or output device(s) 320 may be limited, in comparison with consumer devices such as smartphones. For example, in some embodiments, input device(s) 315 may be limited to a power switch and navigation buttons, and output device(s) 320 may be limited to a small, low power display. In some embodiments, the military communications unit 150 may comprise a Universal Serial Bus (USB) port for power (e.g., battery charging) and/or data communication.

In some embodiments, the military communications unit 150 may comprise one or more sensors 325. The sensor(s) 325 may comprise, for example, one or more accelerometers, gyroscopes, magnetometers, altimeters, proximity sensors, light sensors, and the like. In some embodiments, the sensor(s) 325 may comprise an inertial measurement unit (IMU). Sensor(s) 325 may be utilized, for example, to provide orientation and/or movement information regarding a military entity (soldier, weapon, etc.) to which the military communications unit 150 is attached. Additionally or alternatively, sensor(s) 325 may provide information for dead reckoning and/or other location determination techniques, which may be used to complement wireless positioning performed using data from Global Navigation Satellite System (GNSS) receiver 335 and/or wireless communication interface 340.

According to some embodiments, the military communications unit 150 may comprise a GNSS receiver 335 capable of receiving signals from one or more GNSS satellites using a GNSS antenna 336, and determining a location of the military communications unit 150. The GNSS receiver 335 may support measurement of signals from satellites of a GNSS system, such as Global Positioning System (GPS), Galileo, GLONASS, Quasi-Zenith Satellite System (QZSS), Indian Regional Navigational Satellite System (IRNSS) and/or other Satellite Positioning Systems (SPSes). Ultimately, the GNSS receiver 335 may determine a position of the military communications unit 150 using any combination of one or more global and/or regional navigation satellite systems, augmentation systems, and/or other positioning/navigation systems.

The military communications unit 150 also comprises a wireless communication interface 340. The wireless communication interface 340 may comprise any number of hardware components for wireless communication, including a modem, a network card, an infrared communication device, a wireless communication device, and/or a chipset (e.g., components supporting Bluetooth, IEEE 802.11 (including Wi-Fi), IEEE 802.15.4 (including Zigbee), WiMAX™, cellular communication, etc.), and/or the like, which may enable the military communications unit 150 to wirelessly communicate with the various components illustrated in FIG. 2. To enable this functionality, the wireless communication interface 340 may comprise various transceivers, as illustrated.

A communications network transceiver 343 can be used by the military communications unit 150 to communicate with a communications network (e.g., operational communications network 210 and/or synthetic training environment 205). According to some embodiments, the military communications unit 150 can communicate using traditional commercial cellular frequency bands as well as traditional military bands. And thus, the communications network transceiver 343 may comprise components (including multiple antennas) capable of communicating in these frequencies. For example, in some embodiments, the communications network transceiver 343 may be capable of communicating via an LTE network using LTE frequency bands, as well as communicating VHF and/or UHF frequency bands. In some embodiments, data communicated using non-LTE frequencies may be communicated in accordance with LTE protocols. (In such embodiments, base stations 160 may be similarly configured to communicate in LTE, and/or non-LTE frequencies.) This ability to "re-band" LTE (or other cellular) communications to other frequencies can enable a military (or other entity) to take advantage of whatever frequencies are available for communications.

The wireless communication interface 340 may comprise one or more additional transceivers (345-1 to 345-N, collectively referred to herein as additional transceivers 345) for communicating with local components, as illustrated in FIG. 2. These additional transceivers may provide additional capacity for the military communications unit 150 to communicate with a variety of components using a variety of wireless technologies. Because components are located relatively near to the military communications unit 150, these additional transceivers 345 may communicate using non-cellular wireless technologies such as Bluetooth, Wi-Fi, NFC, etc. The number of additional transceivers may be determined based on the desired capacity for communications using various wireless technologies.

According to some embodiments, the military communications unit 150 may be capable of creating mesh networks, as needed using the wireless communication interface 340. For example, in a patrol comprising several soldiers, each having a military communications unit 150, if one or more of the military communications units 150 within the patrol is unable to communicate with a base station (e.g. because of physical obstacles, RF interference, etc.), data may be relayed to one or more military communications units 150 that are still able to communicate with a base station, thereby enabling each of the military communications units 150 in the patrol to continue to communicate with the synthetic training environment 205 and/or operational communications network 210 seamlessly. To enable this mesh network functionality, communications between the military communications units 150 may utilize one or more of the additional transceivers 345 to communicate with each other (e.g., using Bluetooth, Wi-Fi, etc.)

As noted above, the military communications unit 150 can collect information from local components and communicate the information to the operational communications network 210 and/or synthetic training environment 205. To help provide maximum flexibility in these communications, a flexible distributed computer simulation standard may be used. For example, as previously noted, the operational communications network 210 may be configured to communicate information using DIS and/or HLA. These and similar distributed computer simulation standards include flexible protocol meant to communicate a wide variety of types of data. In instances where particular data does not fit into the protocol of a distributed computer simulation standard such as DIS or HLA, the military communications unit 150 can provide the information as an open protocol, which can be unpackaged by receiving device (e.g., a simulation system, another military communications unit, or other device communicatively coupled with the military communications unit 150) configured to accept the open protocol.

Figure 4:
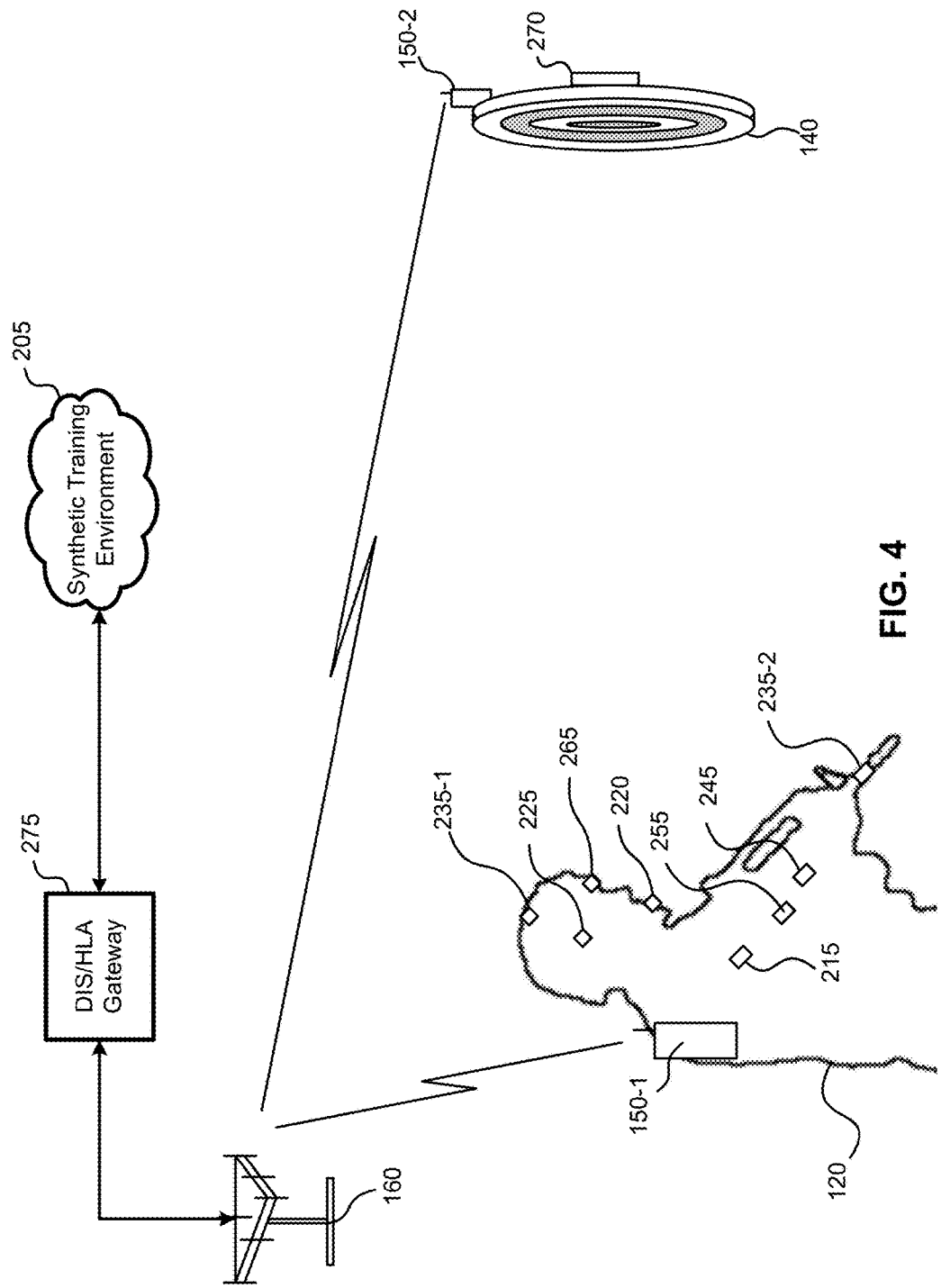
FIG. 4 is an illustration of a portion of a military communication system, according to an embodiment.
Figure 5:
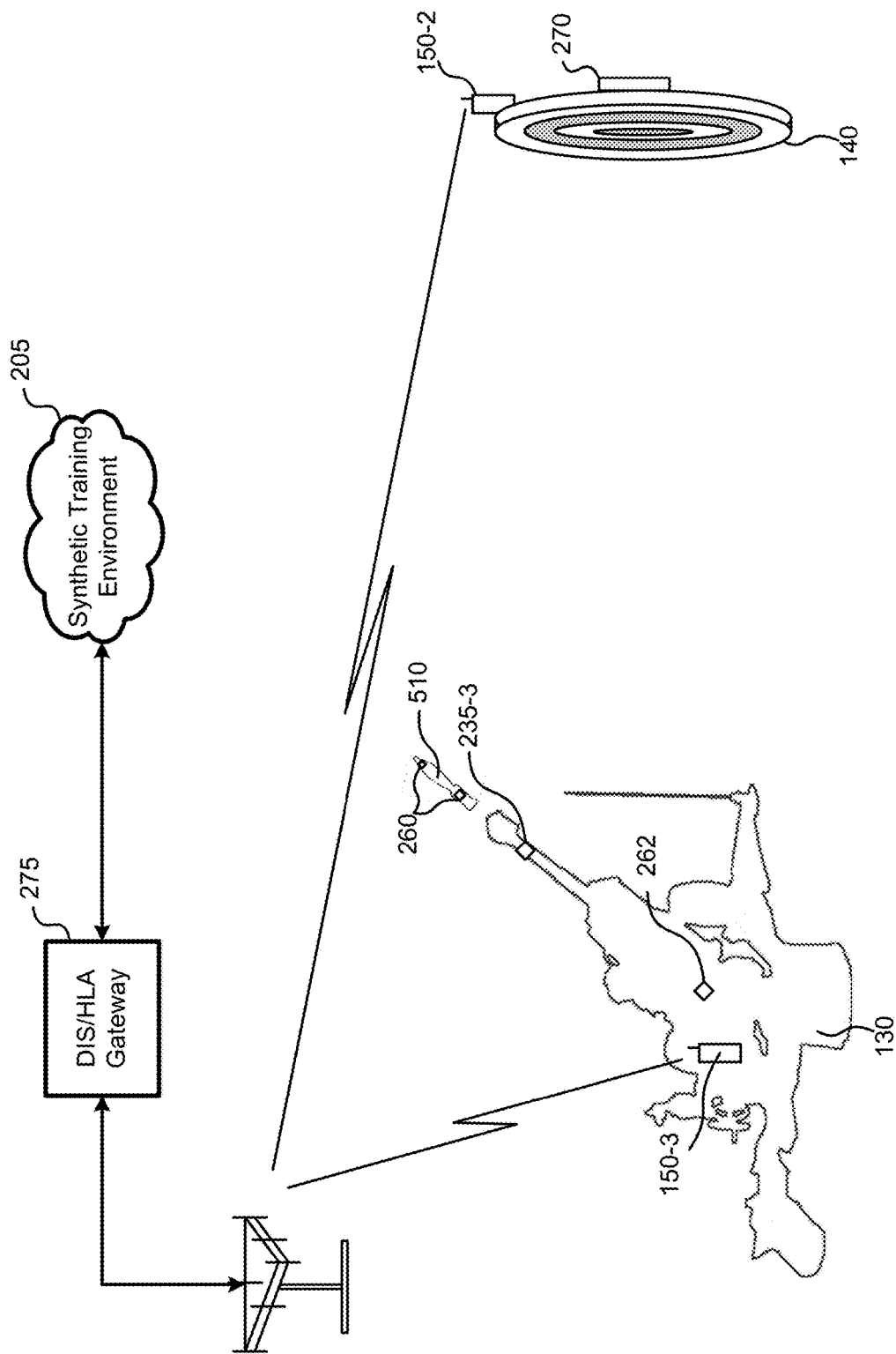
FIG. 5 is an illustration of another portion of a military communication system, according to an embodiment.
Figure 6:
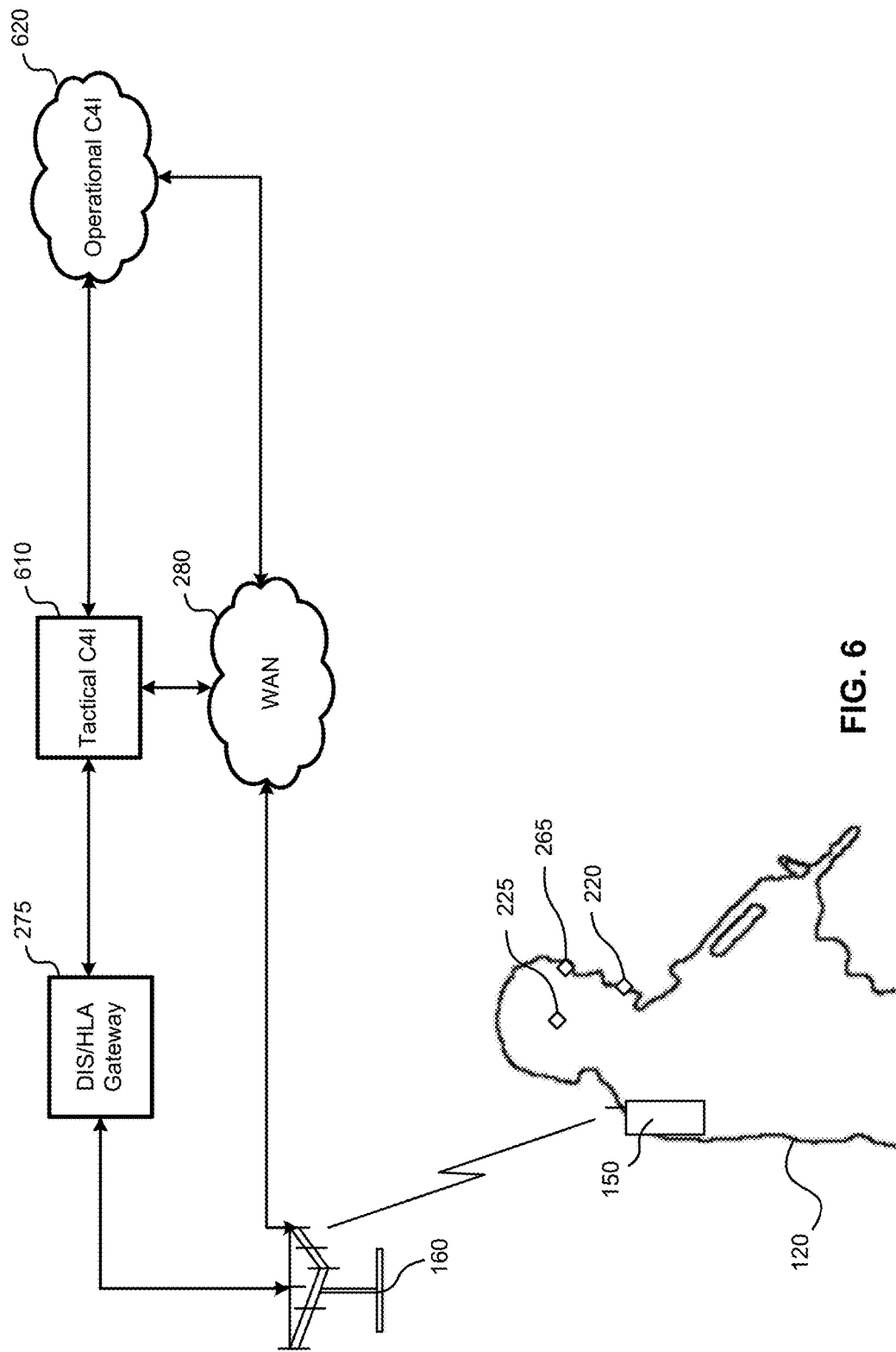
FIG. 6 is an illustration of a portion of a military communication system, according to another embodiment.

FIGS. 4-6 provide illustrative examples of how various components illustrated in FIGS. 1-3 may be utilized in a military communication system, according to embodiments.

FIG. 4 is an illustration of a portion of a military communication system, according to an embodiment. Here, military entities associated with military communications units (150-1 and 150-2, collectively referred to as military communications units 150) include a soldier 120 and a target 140. The military communications units 150 enable communications to and from various devices associated with each military communications unit within the synthetic training environment 205. The vast amounts of data collection enabled by these various devices can provide an immense resource with which a training entity (e.g., military, law enforcement, etc.) can refine and improve its training.

For example, a first military communications unit 150-1 may be associated with a particular soldier 120. Accordingly, the first military communications unit 150-1 may be worn or otherwise carried by the soldier 120, and may communicate with various components also worn and/or used by the soldier 120. As illustrated, devices, one by the soldier can include a biometric unit 215, a microphone 220, a camera, 265, audio headphone 225, and an orientation and fixation device 235-1. Other devices may be located in or on a weapon used by the soldier 120, such as an orientation and fixation device 235-2, a weapon firing detector 245, and a weapon magazine unit 255. Together, these devices can provide data regarding the soldier's location, the soldier's heart rate, direction the soldier is looking (e.g., via orientation and fixation device 235-1), audio communications to and from the soldier 120, direction the weapon is aimed (e.g., via orientation and fixation device 235-2), how much ammunition is in the magazine of the weapon, whether the weapon is fired, and more. A second military communications unit 150-2 may be associated with a target 140, and may be in local communication with a targetry unit 270 of the target 140. Audio communications between soldiers having military communications units 150 can be facilitated via the synthetic training environment 205, enabling the soldier to, for example, give orders to and take orders from other soldiers, who may be remotely located.

If the soldier 120 engages with the target 140, firing the weapon at the target 140, information from both the weapon and the target 140 can be collected and processed by the synthetic training environment 205. For example, using information gathered from the orientation and fixation device 235-2 (which provides the orientation of the weapon), the weapon magazine unit 255, and the weapon firing detector 245, the synthetic training environment 205 can determine whether the weapon has any ammunition to shoot, and, if shot, the path of a live or virtual bullet (depending on whether training used stimulated or live ammunition). (As noted elsewhere herein, the military communications unit 150-1 may be capable of processing ballistics information to determine the trajectory of the bullet, then provide this trajectory to the synthetic training environment 205.)

If the training used simulated ammunition, the synthetic training environment 205 to determine, based on the trajectory of the bullet, whether the target 140, was shot. If so, the synthetic training environment 205 could provide information to the military communications unit 150-2 to indicate that it has been shot. (The target 140 could, for example, include some visual indicator to indicate it has been shot. In the case where the target is another soldier, the other soldier may be provided with a visual, audio, and/or other indication that the soldier has been hit. As such, this functionality could potentially complement or even replace MILES units in training environments.

If live ammunition is used, the targetry unit 270 may detect whether the target 140, has been hit and communicate this information back to the synthetic training environment 205. Information such as when an/or where the target 140 was hit may also be communicated.

FIG. 5 is an illustration of another portion of a military communication system, according to an embodiment. In contrast with FIG. 4, FIG. 5 illustrates functionality of a military communication system in relation to an artillery unit 130. Here, a third military communications unit 150-3 artillery unit 130 may be located on, in, or near the artillery unit 130, and may provide information regarding the location of the artillery unit (e.g., by utilizing a GNSS receiver 335). An orientation and fixation device 235-3 can determine how the artillery unit is aimed. An electric fuse reader 262 can determine whether the electric fuse of a simulated ammunition shell 510 was properly set. For its part, the simulated ammunition shell 510 may comprise electric fuse/charge setter 260, indicating the amount of charge. In the few setting for the ammunition shell 510. With location information from the third military communications unit 150-3, orientation information from the orientation and fixation device 235-3, charge, and fuse information from the electric fuse/charge setter 260, the trajectory of the shell can be determined. Again, this determination may be made by the third military communications unit 150-3. An indication of this trajectory can then be sent to the synthetic training environment 205. The functionality of the target 140, and other components illustrated in FIG. 5, may be similar to corresponding components illustrated and described in relation to FIG. 4.

It can be noted that embodiments may allow for configurations in which there is not a 1:1 ratio between military communications units 150 and military entities as described herein. In some instances, for example, an entire platoon may have only one or two military communications units 150 to communicate information from the entire platoon. In this case, each individual soldier may have one or more sensors/devices associated with the soldier, and these devices may communicate with the communication devices 150 of the platoon. Similarly, for a tank or the vehicle, there may be a single communication device 150 used by all soldiers in the vehicle.

Similarly, some embodiments may allow for subordination of one or more military communications units to another military communications unit. For instance, as soldiers approached or enter a vehicle (e.g., as determined, for example, using any of a variety of location determination techniques). The military communications units of each of the soldiers may become subordinate to a military communications unit of the vehicle. Here, similar to the mesh network example above, the military communications units of each soldier may communicate directly with the military communications unit of the vehicle, rather than to a base station. The military communications unit of the vehicle can then relay this information to the base station. (In some embodiments, the military communications unit of the vehicle may do some processing of the information prior to sending it to a base station.) If, during a simulated battle, the vehicle becomes damaged, the military communications unit of the vehicle can relay instructions to the military communications units of each of the soldiers, indicating, for example, whether they have been "killed" or "injured" for purposes of the training exercise.

FIG. 6 is an illustration of a portion of a military communication system, according to another embodiment. In contrast to FIGS. 4 and 5, the illustration of FIG. 6 shows a configuration for an operational environment. Here, the military communications unit 150 associated with the soldier 120 may be communicatively linked to fewer devices, as needed for a particular operational mission. In FIG. 6, those devices include a microphone, 220, audio headphone 225, and a camera 265. These devices can therefore provide audio communications to and from the soldier 120, as well as stream video captured by the camera 265. Of course, other devices can be used, as desired. In some embodiments, for example, the military communications unit 150 may further be communicatively coupled with a video viewing device 230 to view map information, orders, etc.

Additionally, rather than a generic operational communications network 210 as illustrated in earlier embodiments, FIG. 6 illustrates the use of a tactical Command, Control, Communications, Computers, and Intelligence (C4I) unit 560. This unit may be utilized by a digital command and control system, for example, to gather information for tracking systems (e.g., used to track the soldier 120 and other military entities in operation) in communication systems (e.g., via communication), as well as communicate orders/other information back to the military communications unit 150. The C4I unit 560 may be connected with a DIS/HLA Gateway 275, if needed, to federate DIS/HLA data received from various military communications units 150 in operation. A WAN 280 can act as a communications bearer, enabling communications between the military communications unit 150 and other devices communicatively coupled with the operational C4I network 620.

Figure 7:
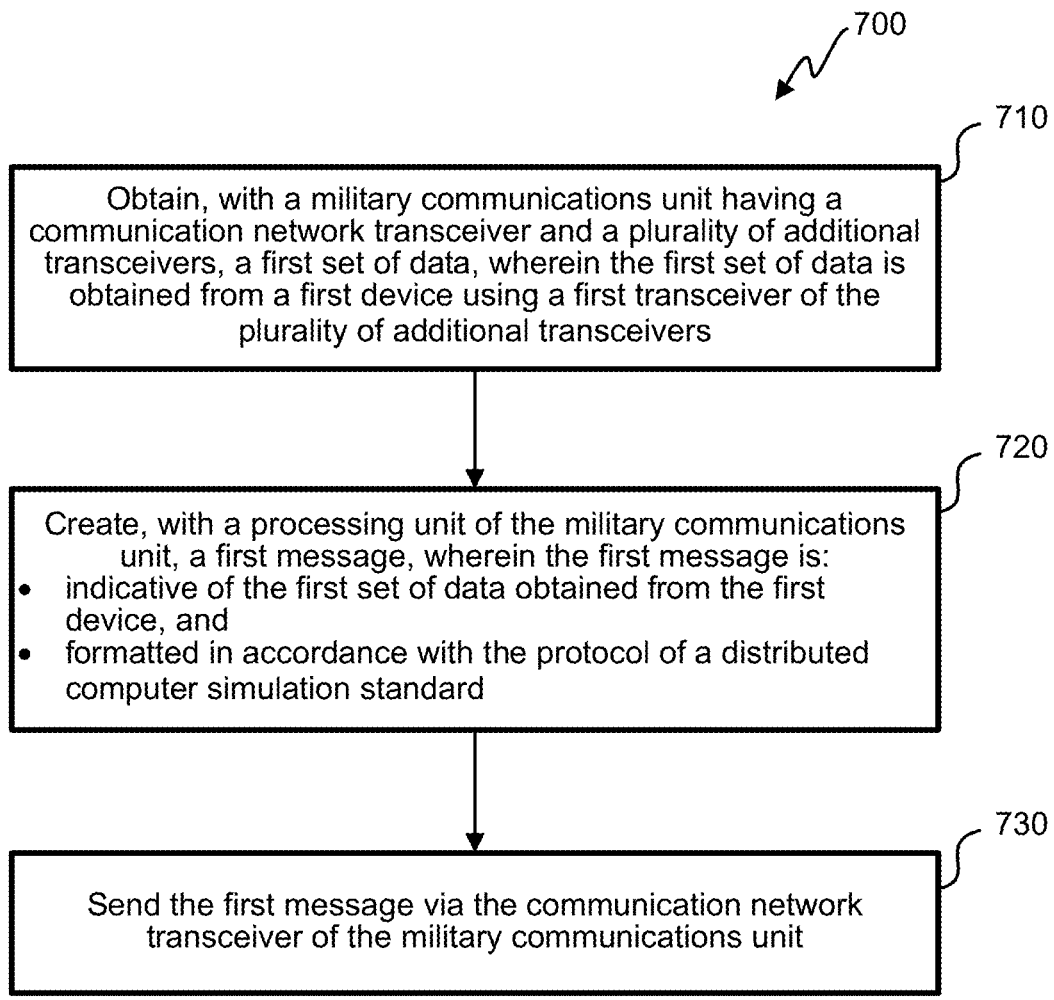
FIG. 7 is a flow diagram, illustrating a method of operating a military communications unit, according to an embodiment.

FIG. 7 is a flow diagram, illustrating a method of operating a military communications unit, according to an embodiment. The method 600 can be implemented by a military communications unit 150 as described in the embodiments above and illustrated in the appended figures. As such, means for performing one or more of the functions of method 700 may comprise hardware and/or software components of an military communications unit 150 as illustrated in FIG. 3 above. As with other figures herein, FIG. 7 is provided as an example. Other embodiments may vary in functionality from the functionality shown. Variations may include performing additional functions, substituting functions, performing functions in a different order or simultaneously, and the like.

The functionality at block 710 comprises obtaining, with a military communications unit having a communication network transceiver in a plurality of additional transceivers, a first set of data. The first set of data is obtained from a first device using a first transceiver of the plurality of additional transceivers. Here, the communication network transceiver may corresponds to the communications network transceiver 343 illustrated in FIG. 3. As such, the communications network transceiver may be configured to communicate with a wireless communication network, such as a WAN, via a base station.

The one or more additional transceivers may correspond with additional transceivers 345 illustrated in FIG. 3 and described in detail above. As such, these one or more additional transceivers may enable communications with various devices local to the military communications unit, as described in the embodiments above. For example, these additional transceivers can be configured to communicate using Bluetooth, Wi-Fi, Zigbee, or Near-Field Communication (NFC), or any combination thereof. As previously described, different configurations of devices may be used for different applications. In some embodiments, for example, the data from the first device may comprise biometric, video, orientation, audio, atmospheric, or activity data, or any combination thereof.

The functionality at block 720 comprises creating, with a processing unit of the military communications unit, a first message. Here, the first message is indicative of the first set of data obtained from the first device, and formatted in accordance with the protocol of the distributed computer simulations standard. As described in the embodiments above, a military communications unit may gather information from local devices and communicate that information, via a distributed computer simulations standard, such as DIS or HLA. Accordingly, at block 730, the functionality comprises sending the first message, the of the communication network transceiver of the military communications unit. In some embodiments, the processing unit may be configured to cause the military communications unit to send the first message, to at least one server executing a synthetic training environment.

As previously discussed, embodiments may include one or more additional functions, depending on desired functionality. For instance, the communication network transceiver may be configured to communicate with wireless communication network using a plurality of radio frequency (RF) bands (e.g., LTE, UHF, VHF, etc.). In some instances, the first set of data may include an orientation of a weapon and an indication that the weapon was fired. In such instances, the military communications unit can further calculate a trajectory of ammunition fired by the weapon based on the first set of, and the first message can comprise an indication of the calculated trajectory. The processing unit may be configured to calculate the trajectory of the ammunition fired by the weapon by executing one of the one or more software applications stored by a memory of the military communications unit. Additionally or alternatively, as previously noted, the military communications unit may further comprise a GNSS receiver and/or an IMU.

Various components may be described herein as being "configured" to perform various operations. Those skilled in the art will recognize that, depending on implementation, such configuration can be accomplished through design, setup, placement, interconnection, and/or programming of the particular components and that, again depending on implementation, a configured component might or might not be reconfigurable for a different operation. Moreover, for many functions described herein, specific means have also been described as being capable of performing such functions. It can be understood, however, that functionality is not limited to the means disclosed. A person of ordinary skill in the art will appreciate that alternative means for performing similar functions may additionally or alternatively be used to those means described herein.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that may comprise memory may comprise non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

Reference throughout this specification to "one example," "an example," "certain examples," or "exemplary implementation" means that a particular feature, structure, or characteristic described in connection with the feature and/or example may be included in at least one feature and/or example of claimed subject matter. Thus, the appearances of the phrase "in one example," "an example," "in certain examples," "in certain implementations," or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms "and," "or," and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

What is claimed is:

1. A military communications unit comprising:
    a wireless communication interface having:
        a communication network transceiver configured to communicate with a wireless communication network;
        a plurality of additional transceivers, each additional transceiver configured to wirelessly communicate with one or more devices separate from the military communications unit;
    a memory;
    a power supply; and
    a processing unit powered by the power supply and communicatively coupled with the wireless communication interface and the memory, the processing unit being configured to cause the military communications unit to:
        obtain, via a first transceiver of the plurality of additional transceivers, a first set of data from a first device of the one or more devices separate from the military communications unit;
        create a message, indicative of the first set of data obtained from the first device, in accordance with a protocol of a distributed computer simulation standard; and
        in response to determining that the communication network transceiver is unable to communicate with a base station of the wireless communication network, send the message to a second military communications unit via the wireless communication interface.

2. The military communications unit of claim 1, wherein the distributed computer simulation standard comprises Distributed Interactive Simulation (DIS) or High-Level Architecture (HLA).

3. The military communications unit of claim 1, wherein one or more transceivers of the plurality of additional transceivers are configured to communicate using Bluetooth, Wi-Fi, Zigbee, or Near-Field Communication (NFC), or any combination thereof.

4. The military communications unit of claim 1, wherein the communication network transceiver is configured to communicate with the wireless communication network using a plurality of radio frequency (RF) bands.

5. The military communications unit of claim 1, wherein the data from the first device comprises biometric, video, orientation, audio, atmospheric, or activity data, or any combination thereof.

6. The military communications unit of claim 1, wherein the processing unit is further configured to send the message via a transceiver of the plurality of additional transceivers.

7. The military communications unit of claim 1, wherein:
the first set of data includes an orientation of a weapon and an indication that the weapon was fired;
the processing unit is further configured to calculate a trajectory of ammunition fired by the weapon, based on the first set of data; and
the message comprises an indication of the calculated trajectory.

8. The military communications unit of claim 7, wherein:
the memory is configured to store one or more software applications, and
the processing unit is configured to calculate the trajectory of the ammunition fired by the weapon by executing one of the one or more software applications stored by the memory.

9. The military communications unit of claim 1, wherein the processing unit is configured to cause the military communications unit send the message to at least one server executing a synthetic training environment.

10. The military communications unit of claim 1, further comprising:
a Global Navigation Satellite System (GNSS) receiver module, and
an Inertial Measurement Unit (IMU).

11. A method of operating a military communications unit, the method comprising:
obtaining, with a military communications unit having a communication network transceiver and a plurality of additional transceivers, a first set of data from a first device of one or more devices separate from the military communications unit, wherein the first set of data is obtained using a first transceiver of the plurality of additional transceivers;
creating, with the military communications unit, a message, wherein the message is:
indicative of the first set of data obtained from the first device, and
formatted in accordance with a protocol of a distributed computer simulation standard; and
in response to determining that the communication network transceiver is unable to communicate with a base station of a wireless communication network, send the message from the military communications unit to a second military communications.

12. The method of claim 11, wherein the distributed computer simulation standard comprises Distributed Interactive Simulation (DIS) or High-Level Architecture (HLA).

13. The method of claim 11, wherein the first transceiver of the plurality of additional transceivers obtains the first set of data using Bluetooth, Wi-Fi, Zigbee, or Near-Field Communication (NFC), or any combination thereof.

14. The method of claim 11, further comprising using the communication network transceiver to communicate with the wireless communication network with a plurality of radio frequency (RF) bands.

15. The method of claim 11, wherein the data from the first device comprises biometric, video, orientation, audio, atmospheric, or activity data, or any combination thereof.

16. The method of claim 11, further comprising sending the message via a transceiver of the plurality of additional transceivers.

17. The method of claim 11, further comprising causing the military communications unit to:
determine, from the first set of data, an orientation of a weapon and an indication that the weapon was fired;
calculate a trajectory of ammunition fired by the weapon, based on the first set of data; and
include, in the message, an indication of the calculated trajectory.

18. The method of claim 17, further comprising executing a software application stored in a memory of the military communications unit to calculate the trajectory of the ammunition fired by the weapon.

19. The method of claim 11, wherein sending the message comprises sending the message to at least one server executing a synthetic training environment.

20. The method of claim 11, further comprising including, in the message, information obtained from:
a Global Navigation Satellite System (GNSS) receiver module of the military communication unit, or
an Inertial Measurement Unit (IMU) of the military communications unit, or
any combination thereof.

* * * * *